US009805664B2

(12) United States Patent
Lin

(10) Patent No.: US 9,805,664 B2
(45) Date of Patent: Oct. 31, 2017

(54) DISPLAY WITH AUTOMATIC IMAGE OPTIMIZING FUNCTION AND RELATED IMAGE ADJUSTING METHOD

(71) Applicant: BENQ Corporation, Taipei (TW)

(72) Inventor: Hsin-Nan Lin, Taipei (TW)

(73) Assignee: BenQ Corporation, Taipei (TW)

( * ) Notice: Subject to any disclaimer, the term of this patent is extended or adjusted under 35 U.S.C. 154(b) by 56 days.

(21) Appl. No.: 15/052,855

(22) Filed: Feb. 24, 2016

(65) Prior Publication Data

US 2017/0213507 A1 Jul. 27, 2017

(30) Foreign Application Priority Data

Jan. 22, 2016 (TW) ............................ 105101990 A

(51) Int. Cl.

| | |
|---|---|
| ***G09G 3/20*** | (2006.01) |
| ***G09G 5/02*** | (2006.01) |
| ***G09G 3/36*** | (2006.01) |
| ***G09G 3/32*** | (2016.01) |
| ***G09G 3/34*** | (2006.01) |
| ***H04N 5/57*** | (2006.01) |
| ***H04N 5/58*** | (2006.01) |
| ***H04N 9/73*** | (2006.01) |
| ***H04N 1/60*** | (2006.01) |
| ***G06T 11/00*** | (2006.01) |

(52) U.S. Cl.

CPC ......... *G09G 3/3406* (2013.01); *G09G 3/2003* (2013.01); *G09G 2320/0626* (2013.01); *G09G 2320/0666* (2013.01)

(58) Field of Classification Search

CPC combination set(s) only.

See application file for complete search history.

(56) References Cited

U.S. PATENT DOCUMENTS

| | | | | |
|---|---|---|---|---|
| 8,749,538 B2 * | 6/2014 | Webster | ............... | G09G 3/3466 345/102 |
| 2007/0171217 A1 | 7/2007 | Tsai | | |
| 2008/0188438 A1 * | 8/2008 | Debinski | ................ | C07K 14/82 514/44 R |
| 2008/0272999 A1 * | 11/2008 | Kurokawa | ........... | G09G 3/3406 345/89 |
| 2009/0219244 A1 * | 9/2009 | Fletcher | ............... | G09G 3/3406 345/102 |
| 2010/0065851 A1 * | 3/2010 | Makita | .................... | H01L 27/12 257/72 |
| 2013/0058572 A1 * | 3/2013 | Kao | ...................... | G06T 3/4007 382/167 |

(Continued)

*Primary Examiner* — Wesner Sajous

(57) ABSTRACT

An image adjusting method is applied to a display with an ambient light sensor. The image adjusting method includes utilizing the ambient light sensor to detect surrounding illumination of the display, adjusting backlight brightness of the display according to the surrounding illumination, adjusting intensity of pixels with specific gray-scale values on the display via a first amending function, and adjusting intensity of other pixels excluding the foresaid pixels having the specific gray-scale values on the display via a second amending function. The first amending function is varied according to the surrounding illumination, and the second amending function is not varied according to the surrounding illumination.

16 Claims, 7 Drawing Sheets

(56) References Cited

U.S. PATENT DOCUMENTS

| | | | | |
|---|---|---|---|---|
| 2014/0055326 | A1* | 2/2014 | Lai | G09G 3/3233 345/77 |
| 2015/0070406 | A1 | 3/2015 | Baek | |
| 2015/0115249 | A1* | 4/2015 | Lin | H01L 51/5209 257/40 |
| 2016/0180758 | A1* | 6/2016 | Buckley | G09G 3/2003 345/691 |
| 2016/0217753 | A1* | 7/2016 | Cao | G09G 3/3607 |
| 2017/0169773 | A1* | 6/2017 | Cao | G09G 3/3607 |

* cited by examiner

DISPLAY WITH AUTOMATIC IMAGE OPTIMIZING FUNCTION AND RELATED IMAGE ADJUSTING METHOD

BACKGROUND OF THE INVENTION

1. Field of the Invention

The present invention relates to a display and a related image adjusting method, and more particularly, to a display and a related image adjusting method with an automatic image optimizing function.

2. Description of the Prior Art

Intensity adjustment of a conventional display is controlled by the user, and the user has to manually press switches or buttons according to operation mode for increasing and decreasing backlight brightness of the display, which means the conventional display has no automatic image optimizing function. A next-generation display includes an ambient light sensor for detecting surrounding illumination of the display, and the next-generation display can automatically adjust the backlight brightness of the panel unit according to variation of the surrounding illumination. The next-generation display having the automatic backlight adjustment is adapted to increase or decrease the intensity of whole pixels on the panel unit. As the image contains a bright pattern and a dark pattern, intensity of the bright pattern are fully increased or intensity of the dark pattern are fully decreased by the conventional automatic backlight adjustment, which results in the blurred and indistinct pattern. Therefore, design of a display apparatus capable of automatically adjusting the backlight brightness by the surrounding illumination and keeping definition of the specific pattern on the image is an important issue in the related display industry.

SUMMARY OF THE INVENTION

The present invention provides a display and a related image adjusting method with an automatic image optimizing function for solving above drawbacks.

According to the claimed invention, an image adjusting method is applied to a display with an ambient light sensor and includes utilizing the ambient light sensor to detect surrounding illumination of the display, adjusting backlight brightness of the display according to the surrounding illumination, adjusting intensity of pixels with specific gray-scale values on the display via a first amending function, and adjusting intensity of other pixels excluding the foresaid pixels having the specific gray-scale values on the display via a second amending function. The first amending function is varied according to the surrounding illumination, and the second amending function is not varied according to the surrounding illumination.

According to the claimed invention, a display with an automatic image optimizing function includes a panel unit, an ambient light sensor, a storing unit and a processing unit. The panel unit is adapted to display an image. The ambient light sensor is disposed by the panel unit and adapted to detect surrounding illumination of the panel unit. The storing unit is adapted to store a plurality of amending functions. The processing unit is electrically connected to the panel unit, the ambient light sensor and the storing unit. The processing unit is adapted to read the surrounding illumination acquired by the ambient light sensor, to adjust backlight brightness of the panel unit according to the surrounding illumination, to adjust intensity of the pixels with the specific gray-scale values on the panel unit via a first amending function of the amending functions, and to adjust intensity of other pixels excluding the foresaid pixels having the specific gray-scale values on the panel unit via a second amending function of the amending functions. The first amending function is varied according to the surrounding illumination and the second amending function is not varied according to the surrounding illumination.

The display and the related image adjusting method of the present invention adjusts the backlight brightness of the panel unit according to the surrounding illumination, and provides local pixel adjustment of applying the amending function by the variation of the surrounding illumination. Some of the high gray-scale value pixels are harsh to the user eyes while the backlight brightness of the panel unit is increased, and some of the low gray-scale value pixels are dim while the backlight brightness of the panel unit is decreased, so that the first amending function is applied to adjust the pixel intensity with the specific gray-scale values (the display may have several first amending functions for selection according to the variation of the surrounding illumination), other pixels excluding the pixel having the specific gray-scale values are slightly adjusted or are constant by the second amending function. The image adjusting method of the present invention can select the suitable amending function according to the surrounding illumination of the display, the pixels on the panel unit are partly adjusted, and the display can provide the optimal image for comfortable view in any environment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
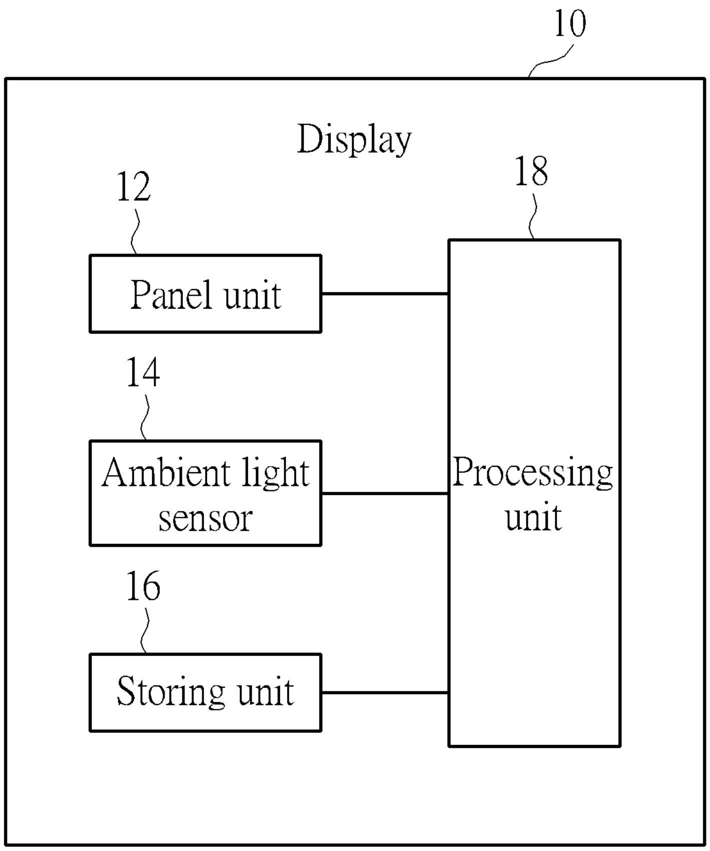
FIG. 1 is a functional block diagram of a display with an automatic image optimizing function according to an embodiment of the present invention.

Please refer to FIG. 1. FIG. 1 is a functional block diagram of a display 10 with an automatic image optimizing function according to an embodiment of the present invention. The display 10 adjusts intensity of an image according to surrounding illumination, and the user can distinctly recognize detailed characteristics of the image without interference of the surrounding illumination. The display 10 includes a panel unit 12, an ambient light sensor 14, a storing unit 16 and a processing unit 18. The panel unit 12 is adapted to display the image according to a control command. The ambient light sensor 14 is disposed by the panel unit 12 and adapted to detect the surrounding illumination of the panel unit 12. The storing unit 16 is adapted to store a plurality of amending functions, and the plurality of amending functions can be selectively applied to specific pixels on the image according to variation of the surrounding illumination for intensity adjustment of the specific pixels. The amending functions arbitrarily can be linear functions or exponential functions, which depend on design demand.

The processing unit 18 is electrically connected to the panel unit 12, the ambient light sensor 14 and the storing unit 16. The ambient light sensor 14 can detect the surrounding illumination of the display 10 periodically or aperiodically. The processing unit 18 reads a detecting result of the ambient light sensor 14 to acquire the current surrounding illumination, and adjusts a backlight brightness of the panel unit 12 according to the current surrounding illumination. In addition, the display 10 of the present invention can select a first amending function, which corresponds to the current surrounding illumination, from the storing unit 16, and utilize the first amending function to adjust intensity of pixels with specific gray-scale values on the panel unit 12; the display 10 further utilizes a second amending function which is not varied according to the current surrounding illumination to adjust intensity of other pixels excluding the foresaid pixels having the specific gray-scale values on the panel unit 12. After the pixel intensity is adjusted by the first amending function and the second amending function, the processing unit 18 further can adjust color parameters of the whole or partial pixels on the panel unit 12, and the said color parameters may be represented as saturation, hue and sharpness.

Figure 2:
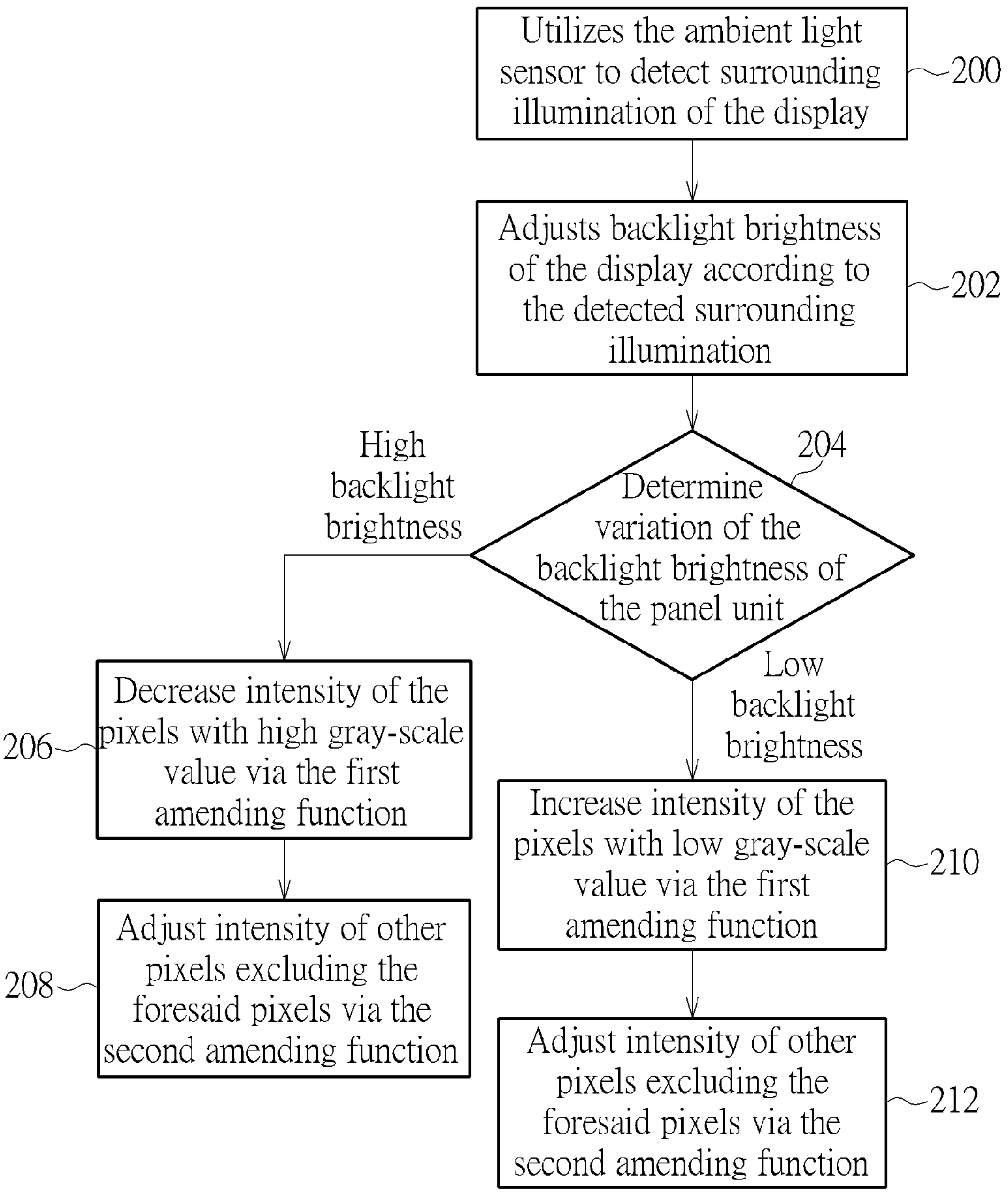
FIG. 2 is a flow chart of an image adjusting method according to the embodiment of the present invention.
Figure 3:
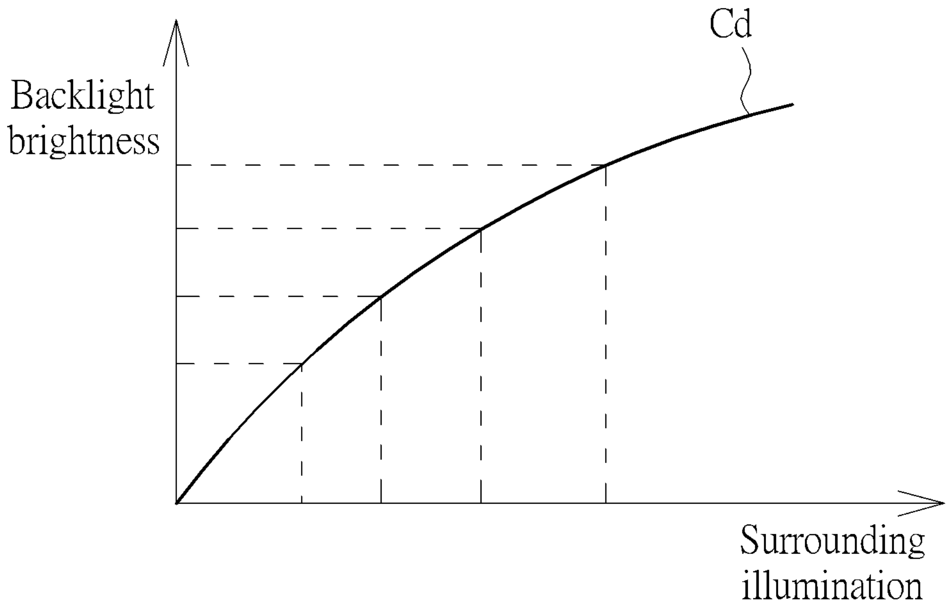
FIG. 3 is a diagram of varying brightness of a panel unit according to the embodiment of the present invention.
Figure 4:
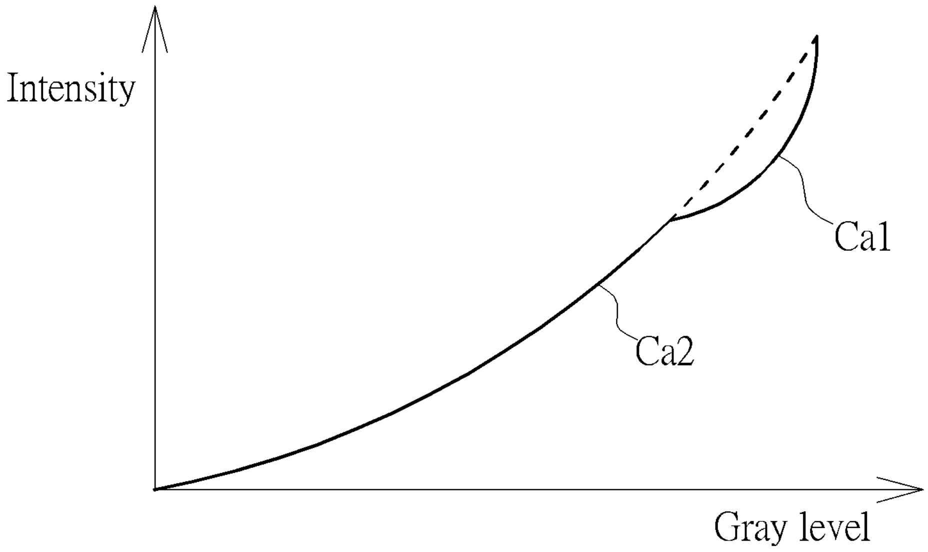
FIG. 4 to FIG. 6 respectively are diagrams of varying pixel intensity on the image in different surrounding illumination according to different embodiments of the present invention.
Figure 5:
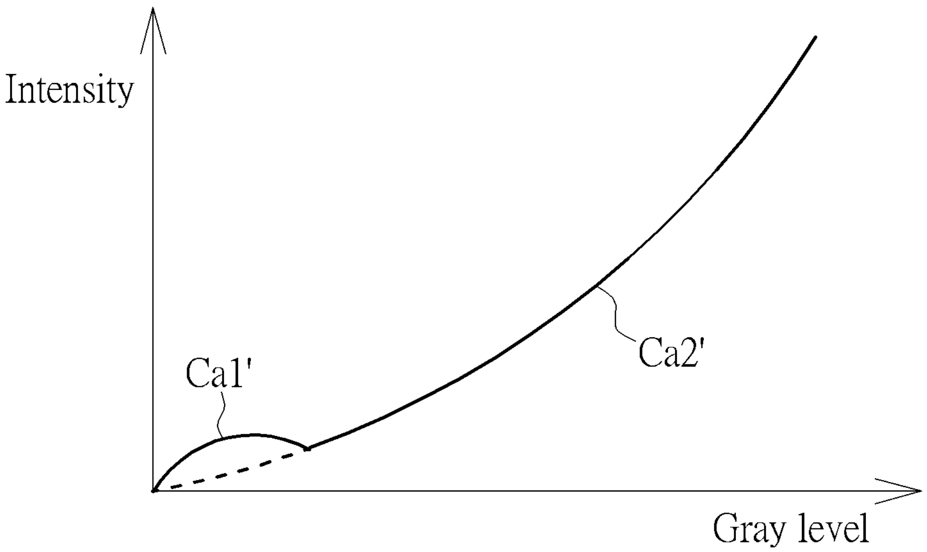
Figure 6:
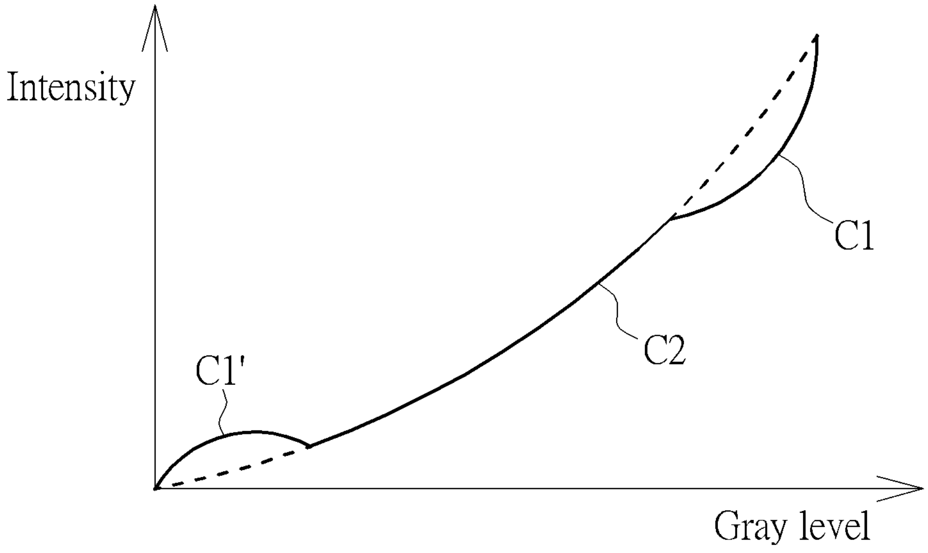

Please refer to FIG. 2 to FIG. 5. FIG. 2 is a flow chart of an image adjusting method according to the embodiment of the present invention. FIG. 3 is a diagram of varying brightness of the panel unit 12 according to the embodiment of the present invention. FIG. 4 to FIG. 6 respectively are diagrams of varying pixel intensity on the image in different surrounding illumination according to different embodiments of the present invention. The image adjusting method illustrated in FIG. 2 is suitable for the display 10 having the ambient light sensor 14 shown in FIG. 1. First, steps 200 and 202 are executed that the display 10 utilizes the ambient light sensor 14 to detect the surrounding illumination of the display 10, and adjusts the backlight brightness of the display 10 according to the detected surrounding illumination. The storing unit 16 has a predetermined compared function Cd, and the compared function Cd can be divided into a plurality of brightness domains by values of the surrounding illumination, as shown in FIG. 3. While the detected current surrounding illumination conforms to one of the plurality of brightness domains, the conformed brightness domain is selected, and the compared function Cd is utilized to acquire the corresponding backlight brightness. For example, while the surrounding illumination is greater than a threshold, the display 10 is adjusted to increase the backlight brightness; while the surrounding illumination is lower than the threshold, the display 10 is adjusted to decrease the backlight brightness. The foresaid threshold can be represented as, but not limited to, a side line between the brightness domains shown in FIG. 3. That is, the backlight brightness of the display 10 can be adaptively adjusted according to the compared function Cd while the processing unit 18 acquires the surrounding illumination of the display 10.

The intensity of the whole pixels on the panel unit 12 is increased or decreased in step 202, which cannot generate an image frame with comfortable effect. Therefore, the image adjusting method executes step 204 to determine variation of the backlight brightness of the panel unit 12 by the processing unit 18. While the panel unit is adjusted to increase the backlight brightness, the high gray-scale value pixels are defined as the pixels with the specific gray-scale values, and steps 206 and 208 are executed to decrease the intensity of the high gray-scale value pixels via the first amending function Ca1, and further to adjust the intensity of other pixels excluding the foresaid pixels having the high gray-scale values via the second amending function Ca2. The first amending function Ca1 can be varied according to the surrounding illumination (or the corresponding backlight brightness), which means the surrounding illumination is related to one of the brightness domains shown in FIG. 3 for acquiring a corresponding first amending function Ca1. The second amending function Ca2 is not varied according to the surrounding illumination (or the corresponding backlight brightness). While the panel unit 12 is adjusted to increase the backlight brightness, the high gray-scale value pixels are harsh to the user eyes, so the intensity of the high gray-scale value pixels is widely decreased by the first amending function Ca1, and the intensity of other pixels excluding the high gray-scale value pixels is slightly decrease or not adjusted by the second amending function Ca2, as shown in FIG. 4.

Parameters of the second amending function Ca2 are not varied according to the surrounding illumination, which means the second amending function Ca2 is kept as the curve shown in FIG. 4 no matter what surrounding illumination the ambient light sensor 14 detects and no matter how backlight brightness of the panel unit 12 is varied. Moreover, the storing unit 16 may have several first amending functions Ca1 and Cb1 (an amount of the first amending function is not limited to this embodiment). Generally, the image adjusting method may utilize the first amending function Ca1 (which is different from the second amending function Ca2) to decrease the intensity of the high gray-scale value pixels; while the surrounding illumination is brighter than the above-mentioned situation, the image adjusting method can utilize the first amending function Cb1 to decrease the intensity of the high gray-scale value pixels, and an intensity effect of the high gray-scale value pixels processed by the first amending function Cb1 is preferable to the intensity effect of the high gray-scale value pixels processed by the first amending function Ca1. The amount and curved variation of the first amending function are not limited to the embodiment shown in FIG. 4, which depend on design demand.

While the panel unit 12 is adjusted to decrease the backlight brightness, the low gray-scale value pixels are defined as the pixels with the specific gray-scale values. In the meantime, steps 210 and 212 are executed by the processing unit 18 to utilize the first amending function Ca1' to increase the intensity of the low gray-scale value pixels (or, selectively utilizing the first amending function Cb1' to increase the intensity of the low gray-scale value pixels according to the surrounding illumination and variation of the backlight brightness), and further to utilize the second amending function Ca2' to adjust the intensity of other pixels excluding the low gray-scale value pixels. As mentioned above, the first amending function Ca1' can be varied according to the surrounding illumination (or the corresponding backlight brightness), and the second amending function Ca2' is not varied by the surrounding illumination (or the corresponding backlight brightness). While the panel unit 12 is adjusted to decrease the backlight brightness, the low gray-scale value pixels are dim and hard to identify, so the intensity of the low gray-scale value pixels can be widely increased by the first amending function Ca1', and the intensity of other pixels excluding the low gray-scale value pixels are slightly increased or not adjusted by the second amending function Ca2', as shown in FIG. 5.

In another possible embodiment, the image adjusting method may selectively increase the intensity of the pixels having the specific low gray-scale value on the panel unit 12 while steps 206 and 208 are executed; as shown in FIG. 6, the first amending functions C1 and C1' are respectively utilized to decrease and increase the specific high gray-scale value pixels and the specific low gray-scale value pixels on the image, and other pixels excluding the high gray-scale value pixels and the low gray-scale value pixels on the image are adjusted by the second amending function C2. Accordingly, after execution of steps 210 and 212, the image adjusting method may further decrease the intensity of the pixels having the specific high gray-scale value on the panel unit 12, such as adjusting the specific high gray-scale value pixels and the specific low gray-scale value pixels by the first amending functions C1 and C1', and adjusting other pixels excluding the high gray-scale value pixels and the low gray-scale value pixels by the second amending function C2. Because the image displayed on the panel unit 12 may be distorted by amendment of the first amending function and the second amending function, the image adjusting method further can adjust the color parameters of the whole or partial pixels on the panel unit 12 after execution of steps 208 or 212, so as to make the displaying image fit in with real color.

Figure 7:
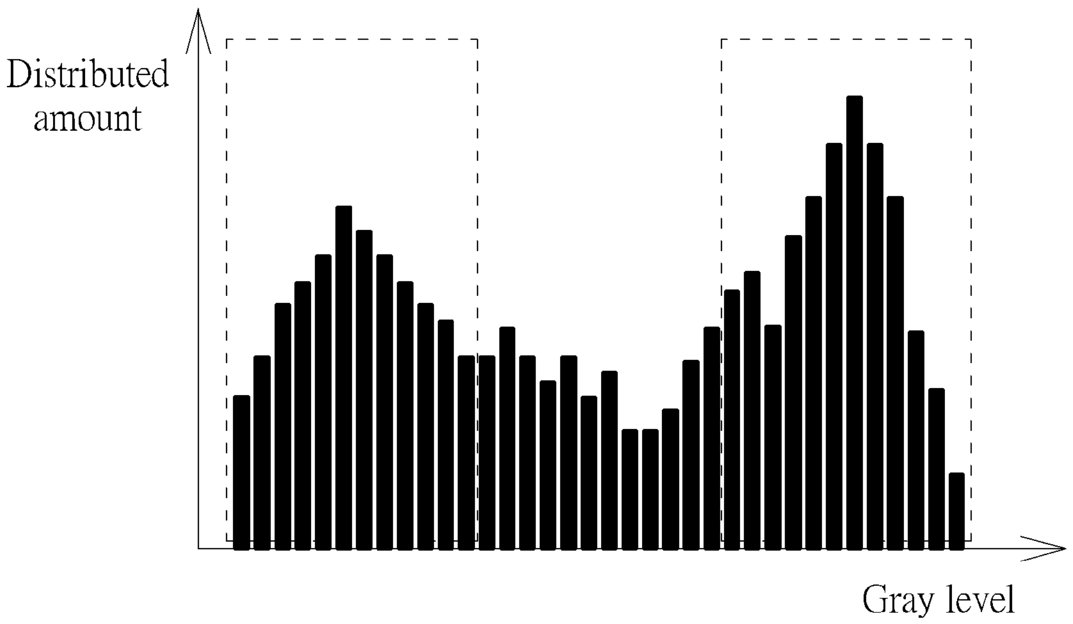
FIG. 7 is a gray level histogram of the image displayed on the panel unit according to the embodiment of the present invention.

The image adjusting method of the present invention can directly adjust the backlight brightness of the panel unit 12 according to the surrounding illumination detected by the ambient light sensor 14, and then adjust the intensity of pixel with the specific known gray-scale values and other pixels excluding the foresaid pixels having the specific gray-scale values on the panel unit 12 respectively by the first amending function and the second amending function; however, the present invention still can determine how to adjust the specific pixels on the panel unit 12 by other skills. Please refer to FIG. 7. FIG. 7 is a gray level histogram of the image displayed on the panel unit 12 according to the embodiment of the present invention. The processing unit 18 can generate the gray level histogram according to the image on the panel unit 12, and calculate a pixel amount of a boundary region (which is represented as the dotted region shown in FIG. 7) on the gray level histogram, and determine whether the image has specific pixel with over-bright or over-dark gray-scale values according to the pixel amount inside the boundary region, so as to decide whether the first amending function and/or the second amending function is applied to adjust the pixel intensity inside the boundary region.

In conclusion, the display and the related image adjusting method of the present invention adjusts the backlight brightness of the panel unit according to the surrounding illumination, and provides local pixel adjustment of applying the amending function by the variation of the surrounding illumination. Some of the high gray-scale value pixels are harsh to the user eyes while the backlight brightness of the panel unit is increased, and some of the low gray-scale value pixels are dim while the backlight brightness of the panel unit is decreased, so that the first amending function is applied to adjust the pixel intensity with the specific gray-scale values (the display may have several first amending functions for selection according to the variation of the surrounding illumination), other pixels excluding the pixel having the specific gray-scale values are slightly adjusted or are constant by the second amending function. Comparing to the prior art, the image adjusting method of the present invention can select the suitable amending function according to the surrounding illumination of the display, the pixels on the panel unit are partly adjusted, and the display can provide the optimal image for comfortable view in any environment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjusting method is applied to a display with an ambient light sensor, the image adjusting method comprising:

utilizing the ambient light sensor to detect surrounding illumination of the display;

adjusting backlight brightness of the display according to the surrounding illumination;

adjusting intensity of pixels with specific gray-scale values on the display via a first amending function, wherein the first amending function is varied according to the surrounding illumination; and adjusting intensity of other pixels excluding the foresaid pixels having the specific gray-scale values on the display via a second amending function, wherein the second amending function is not varied according to the surrounding illumination.

2. The image adjusting method of claim 1, further comprising:

adjusting color parameters of the whole or partial pixels on the display.

3. The image adjusting method of claim 1, wherein the pixels with the specific gray-scale values is the high gray-scale value pixels and/or the low gray-scale value pixels.

4. The image adjusting method of claim 3, wherein while the ambient light sensor detects the surrounding illumination greater than a threshold, the display is adjusted to increase the backlight brightness and the first amending function decreases the intensity of the high gray-scale value pixels.

5. The image adjusting method of claim 3, wherein while the ambient light sensor detects the surrounding illumination lower than a threshold, the display is adjusted to decrease the backlight brightness and the first amending function increases the intensity of the low gray-scale value pixels.

6. The image adjusting method of claim 1, wherein a step of adjusting the backlight brightness of the display according to the surrounding illumination comprises: determining the surrounding illumination conforms to which one of a plurality of brightness domains, and adjusting the backlight brightness of the display as a value corresponding to a conformed brightness domain.

7. The image adjusting method of claim 6, wherein the foresaid amending functions are predetermined functions respectively corresponding to the plurality of brightness domains.

8. The image adjusting method of claim 1, wherein before executing a step of adjusting the intensity of pixels with the specific gray-scale values on the display via the first amending function, the image adjusting method further comprises:

generating a gray level histogram of an image on the display;

calculating a pixel amount of a boundary region on the gray level histogram; and determining whether the first amending function is utilized to adjust intensity of pixels on the boundary region according to the pixel amount;

wherein the step of adjusting the intensity of pixels with the specific gray-scale values on the display via the first amending function comprises:

while the intensity of pixels on the boundary region is confirmed to be adjusted by an amending function, the first amending function is selected and utilized to adjust the intensity of pixels with the specific gray-scale values on the display, and the pixels on the boundary region are represented as the pixels with the specific gray-scale values.

9. A display with an automatic image optimizing function, the display comprising:

a panel unit adapted to display an image;

an ambient light sensor disposed by the panel unit and adapted to detect surrounding illumination of the panel unit;

a storing unit adapted to store a plurality of amending functions; and a processing unit electrically connected to the panel unit, the ambient light sensor and the storing unit, the processing unit being adapted to read the surrounding illumination acquired by the ambient light sensor, to adjust backlight brightness of the panel unit according to the surrounding illumination, to adjust intensity of the pixels with the specific gray-scale values on the panel unit via a first amending function of the amending functions, and to adjust intensity of other pixels excluding the foresaid pixels having the specific gray-scale values on the panel unit via a second amending function of the amending functions, wherein the first amending function is varied according to the surrounding illumination and the second amending function is not varied according to the surrounding illumination.

10. The display of claim 9, wherein the processing unit is adapted to adjust color parameters of the whole or partial pixels on the panel unit while the intensity of the pixels with the specific gray-scale values is adjusted.

11. The display of claim 9, wherein the pixels with the specific gray-scale values is the high gray-scale value pixels and/or the low gray-scale value pixels.

12. The display of claim 11, wherein the while the ambient light sensor detects the surrounding illumination greater than a threshold, the panel unit is adjusted to increase the backlight brightness, and the processing unit decreases the intensity of the high gray-scale value pixels according to the first amending function.

13. The display of claim 11, wherein the while the ambient light sensor detects the surrounding illumination lower than a threshold, the panel unit is adjusted to decrease the backlight brightness, and the processing unit increases the intensity of the low gray-scale value pixels according to the first amending function.

14. The display of claim 9, wherein the storing unit has information about a plurality of brightness domains, the processing unit is adapted to determine the surrounding illumination conforms to which one of the plurality of brightness domains, and to adjust the backlight brightness of the display as a value corresponding to a conformed brightness domain.

15. The display of claim 14, wherein the amending functions are predetermined functions respectively corresponding to the plurality of brightness domains.

16. The display of claim 9, wherein the processing unit is further adapted to generate a gray level histogram of the image, to calculate a pixel amount of a boundary region on the gray level histogram, and to determine whether the amending functions are utilized to adjust pixel intensity of the boundary region according to the pixel amount.

* * * * *